United States Patent
Lin et al.

(10) Patent No.: US 9,122,051 B2
(45) Date of Patent: Sep. 1, 2015

(54) LIGHT MODULE AND PROJECTION DEVICE

(71) Applicant: Young Optics Inc., Hsinchu (TW)

(72) Inventors: Yu-Hsiu Lin, Hsinchu (TW); Hung-You Cheng, Hsinchu (TW); Yu-Po Chen, Hsinchu (TW); S-Wei Chen, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 7 days.

(21) Appl. No.: 14/143,215

(22) Filed: Dec. 30, 2013

(65) Prior Publication Data

US 2014/0293234 A1 Oct. 2, 2014

(30) Foreign Application Priority Data

Apr. 2, 2013 (CN) .......................... 2013 1 0112258

(51) Int. Cl.
| | |
|---|---|
| *G03B 21/00* | (2006.01) |
| *G02B 26/00* | (2006.01) |
| *G03B 21/20* | (2006.01) |
| *G03B 33/12* | (2006.01) |
| *H04N 9/31* | (2006.01) |

(52) U.S. Cl.
CPC ............ *G02B 26/007* (2013.01); *G03B 21/204* (2013.01); *G03B 21/208* (2013.01); *G03B 21/2013* (2013.01); *G03B 33/12* (2013.01); *H04N 9/3158* (2013.01)

(58) Field of Classification Search
CPC ............................. G03B 21/204; G02B 26/007
USPC ........ 353/31, 37, 38, 84, 85, 94; 362/84, 231, 362/293, 317, 551, 393
See application file for complete search history.

(56) References Cited

U.S. PATENT DOCUMENTS

| | | | |
|---|---|---|---|
| 5,743,611 A | 4/1998 | Yamaguchi et al. | |
| 7,172,294 B2 | 2/2007 | Yano et al. | |
| 8,740,406 B2 * | 6/2014 | Yang et al. | 362/231 |
| 2001/0010371 A1 | 8/2001 | Carey et al. | |
| 2009/0040754 A1 * | 2/2009 | Brukilacchio et al. | 362/228 |
| 2011/0044046 A1 * | 2/2011 | Abu-Ageel | 362/259 |
| 2011/0228232 A1 * | 9/2011 | Sakata et al. | 353/31 |
| 2012/0019788 A1 * | 1/2012 | Katou et al. | 353/33 |
| 2013/0113911 A1 * | 5/2013 | Hanano et al. | 348/79 |

FOREIGN PATENT DOCUMENTS

| | | |
|---|---|---|
| CN | 2621303 | 6/2004 |
| CN | 1637585 | 7/2005 |
| CN | 101263420 | 9/2008 |
| CN | 102213384 | 10/2011 |

* cited by examiner

*Primary Examiner* — Sultan Chowdhury
(74) *Attorney, Agent, or Firm* — WPAT, PC; Justin King (57) ABSTRACT

A light module includes a first light source. The first light source includes a first light-emitting element and a first lens element. The first light-emitting element includes a first light-emitting chip for emitting a first color light beam and a wavelength conversion material located on the first light-emitting chip for transferring parts of the first color light beam to a second color light beam. The first lens element faces the first light-emitting element and is located on a transmission path of the first color light beam and a transmission path of the second color light beam, and the first lens element includes an optical filter for filtering off the first color light beam and being passed by the second color light beam.

20 Claims, 9 Drawing Sheets

LIGHT MODULE AND PROJECTION DEVICE

FIELD OF THE INVENTION

The invention relates to a projection device. More particularly, the invention relates a light module used in a projection device.

BACKGROUND OF THE INVENTION

Recently, the miniature projection device usually uses three kinds of LED chips such as a red-light LED chip, a green-light LED chip and a blue-light LED chip. The red-light LED chip, the green-light LED chip and the blue-light LED chip may respectively emit the red light, the green light and the blue light such that the miniature projection device may project the full-color image. Since the blue-light LED and the violet-light LED have high light-emitting efficiency, they are used to provide a green light by exciting a phosphor, and the brightness of the green-light emitted therefrom is greater than that of the green-light emitted from the green-light LED chip under the same current condition.

Furthermore, the miniature projection device always has a lens made of the plastic in order to reduce the cost and the weight, but the lens made of the plastic may be easily aged and deteriorated when the blue light or the violet light having the over-high energy directly emits to the lens made of the plastic. In addition, the foregoing disadvantages may cause the reliability of the miniature projection device lower under a long term usage.

SUMMARY OF THE INVENTION

The invention provides a light module includes a first light source. The first light source includes a first light-emitting element and a first lens element. The first light-emitting element includes a first light-emitting chip for emitting a first color light beam and a wavelength conversion material located on the first light-emitting chip for transferring parts of the first color light beam to a second color light beam. The first lens element faces the first light-emitting element and is located across a transduction pathway of the first color light beam and a transduction pathway of the second color light beam, and the first lens element includes an optical filter for filtering off the first color light beam and passed by the second color light beam.

According to another embodiment disclosed herein, the first color light beam is a violet light having a wavelength range from 400 nm to 450 nm, and the second color light beam is a green light.

According to another embodiment disclosed herein, the light module further includes a second light source, a third light source and a light combining element. The second light source is used for emitting a third color light beam. The third light source is used for emitting a fourth color light beam. The light combining element is used for receiving the second color light beam, the third color light beam and the fourth color light beam to make the second color light beam, the third color light beam and the fourth color light beam emit in the same direction and be formed a lighting beam.

According to another embodiment disclosed herein, the optical filter is a high-pass filter and a spectral wavelength half-width of a transmission spectrum of the high-pass filter is ranged from 440 nm to 490 nm, and a wavelength variance of the transmission spectrum of the high-pass filter is less than 30 nm in a transmittance variance of the high-pass filter ranged from 10% to 90%.

According to another embodiment disclosed herein, the first light-emitting element further includes a second light-emitting chip for emitting a third color light beam. The first lens element is located on a transmission path of the third color light beam. The optical filter is used for being passed by the third color light beam. The light module further includes a second color light source and a light combining element. The second light source is used for emitting a fourth color light beam and the light combining element is used for receiving the second color light beam, the third color light beam and the fourth color light beam to make the second color light beam, the third color light beam and the fourth color light beam emit in the same direction and be formed a lighting beam.

According to another embodiment disclosed herein, the third color light beam is a red light, and the optical filter is a high-pass filter and a spectral wavelength half-width of a transmission spectrum of the high-pass filter is ranged from 440 nm to 490 nm, and a wavelength variance of the transmission spectrum of the high-pass filter is less than 30 nm in a transmittance variance of the high-pass filter ranged from 10% to 90%.

According to another embodiment disclosed herein, the third color light beam is a blue light having a wavelength range from 440 nm to 480 nm, and the optical filter is a high-pass filter and a spectral wavelength half-width of a transmission spectrum of the high-pass filter is ranged from 420 nm to 460 nm, and a wavelength variance of the transmission spectrum of the high-pass filter is less than 20 nm in a transmittance variance of the high-pass filter ranged from 10% to 90%. According to another embodiment disclosed herein, the module further includes a second light source and a light combining element. The second light source includes a second light-emitting element and a second lens element. The second light-emitting element includes a second light-emitting chip for emitting a third color light beam and a third light-emitting chip for emitting a fourth color light beam. The second lens element faces the second light-emitting element and is located on a transmission path of the third color light beam and a transmission path of the fourth color light beam, and the second lens element includes an optical filter passed by the third color light beam and the fourth color light beam. The light combining element is used for receiving the second color light beam, the third color light beam and the fourth color light beam to make the second color light beam, third color light beam, and the fourth color light beam emit in the same direction and be formed a lighting beam.

According to another embodiment disclosed herein, the third color light beam is a blue light having a wavelength range from 440 nm to 480 nm, and the optical filter is a high-pass filter and a spectral wavelength half-width of a transmission spectrum of the high-pass filter is ranged from 420 nm to 460 nm, and a wavelength variance of the transmission spectrum of the high-pass filter is less than 20 nm in a transmittance variance of the high-pass filter ranged from 10% to 90%.

According to another embodiment disclosed herein, the first light-emitting element further comprises a second light-emitting chip for emitting a third color light beam and a third light-emitting chip for emitting a fourth color light beam, and the first lens element is further located on a transmission path of the third color light beam and a transmission path of the fourth color light beam, and the optical filter is passed by the third color light beam and the forth color light beam, and the light module further comprises a light combining element for receiving the second color light beam, the third color light beam and the fourth color light beam to make the second color light beam, the third color light beam and the fourth color light beam emit in the same direction and be formed a lighting beam.

According to another embodiment disclosed herein, the third color light beam is a red light and the fourth color light beam is a blue light having a wavelength range from 440 nm to 480 nm, and the optical filter is a high-pass filter and a spectral wavelength half-width of a transmission spectrum of the high-pass filter is ranged from 420 nm to 460 nm, and a wavelength variance of the transmission spectrum of the high-pass filter is less than 20 nm in a transmittance variance of the high-pass filter ranged from 10% to 90%.

The invention according to another embodiment provides a projection device includes a light module, a light valve and a projection lens. The light valve is disposed across a transmission path of a lighting beam for transferring the lighting beam to an image beam. The projection lens is disposed on a transmission path of the image beam.

The optical filter disposed on a surface of the first lens element that is close to the first light-emitting element may filter off the first color light beam emitted by the first light-emitting element such that the first color light beam having high energy may not emit to the lens element made of a plastic of the projection device. Therefore, a reliability of the projection device may increase under a long term usage of the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
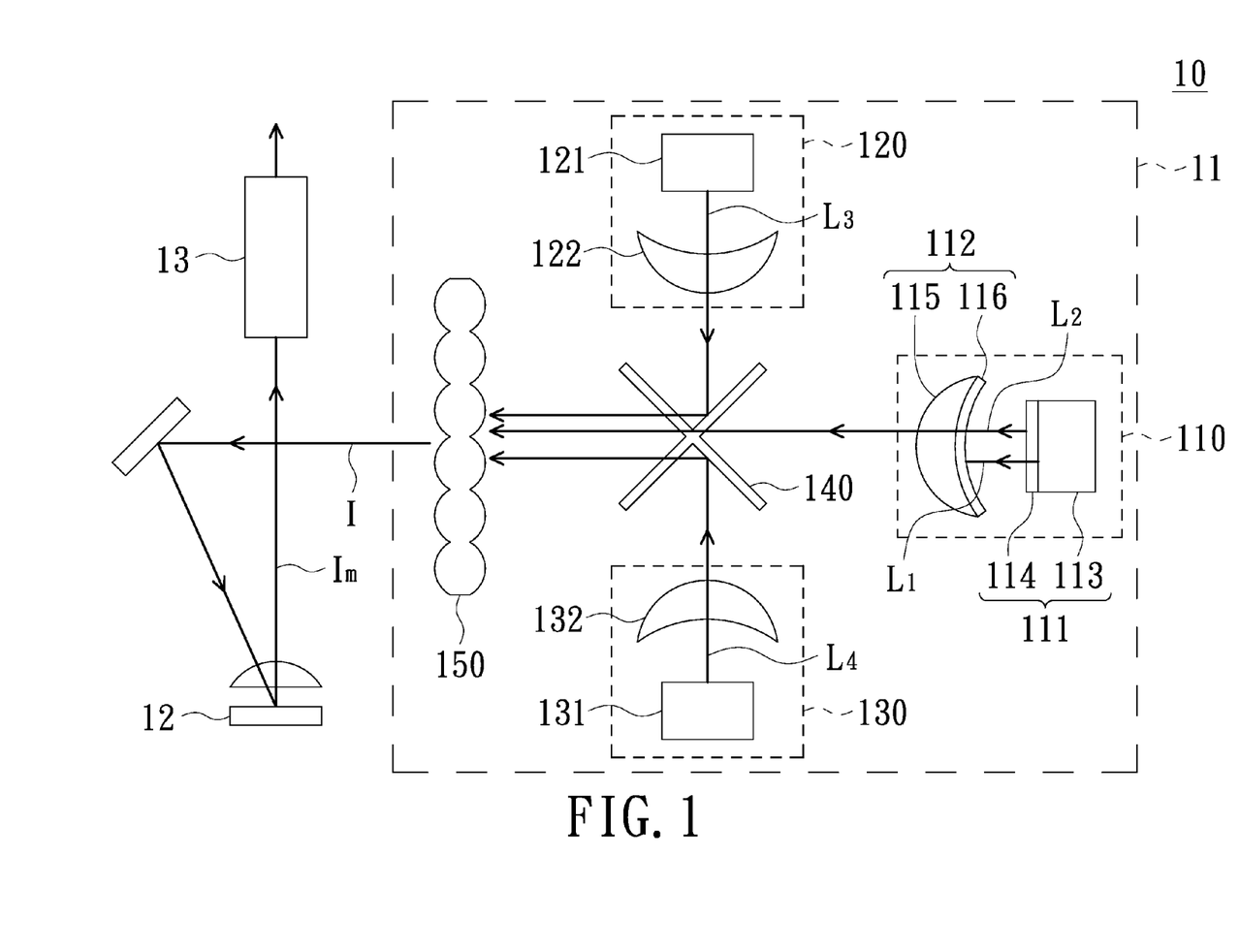
FIG. 1 illustrates a schematic view of a projection device according to a first embodiment of the invention.

FIG. 1 shows a schematic view of a projection device according to a first embodiment of the invention. The projection device 10 includes a light module 11, a light valve 12, and a projection lens 13. The light valve 12 is disposed on a transmission path of a lighting beam I emitted by the light module 11 and used for transferring the lighting beam I to an image beam Im. The projection lens 13 is disposed on a transmission path of the image beam Im and used for projecting the image beam Im outward.

The light module 11 includes a first light source 110, a second light source 120, a third light source 130 and a light combining element 140. The first light source 110 includes a first light-emitting element 111 and a first lens element 112. The first light-emitting element 111 includes a first light-emitting chip 113 and a wavelength conversion material 114 located on the first light-emitting chip 113. The first light-emitting chip 113 is used for emitting a first color light beam L1. In this embodiment, the first color light beam L1 may be, but not limited to, a violet light having a wavelength range from 400 nm to 450 nm. The wavelength conversion material 114 is used for transferring parts of the first color light beam L1 to a second color light beam L2. In this embodiment, the second color light beam L2 may be, but not limited to, a green light. The first lens element 112 faces the first light-emitting element 111 and is simultaneously located on a transmission path of the first color light beam L1 and a transmission path of the second color light beam L2, in which the first lens element 112 includes a collimator lens 115 and an optical filter 116 located on a surface of the collimator lens 115. In this embodiment, the optical filter 116 is a high-pass filter for filtering off the first color light beam L1 and being passed by the second color light beam L2. In other words, the second color light beam L2 is able to pass through the optical filter 116.

The second light source 120 includes a second light-emitting element 121 and a second lens element 122, in which the second light-emitting element 121 is used for emitting a third color light beam L3. In this embodiment, the third color light beam L3 may be, but not limited to, a red light. The second lens element 122 is located on a transmission path of the third color light beam L3.

The third light source 130 includes a third light-emitting element 131 and a third lens element 132, in which the third light-emitting element 131 is used for emitting a fourth color light beam L4. In this embodiment, the fourth color light beam L4 may be, but not limited to, a blue light. The third lens element 132 is located on a transmission path of the fourth color light beam L4.

In this embodiment, the light combining element 140 may be, but not limited to, an X-plate and used for receiving the second color light beam L2, the third color light beam L3 and the fourth color light beam L4 to make the second color light beam L2, the third color light beam L3 and the fourth color light beam L4 emit in the same direction. In addition, a light uniforming element 150 may make the second color light beam L2, the third color light beam L3 and the fourth color light beam L4 to form a uniform lighting beam I. In this embodiment, the light uniforming element 150 may be, but not limited to, a micro lens array.

Figure 2:
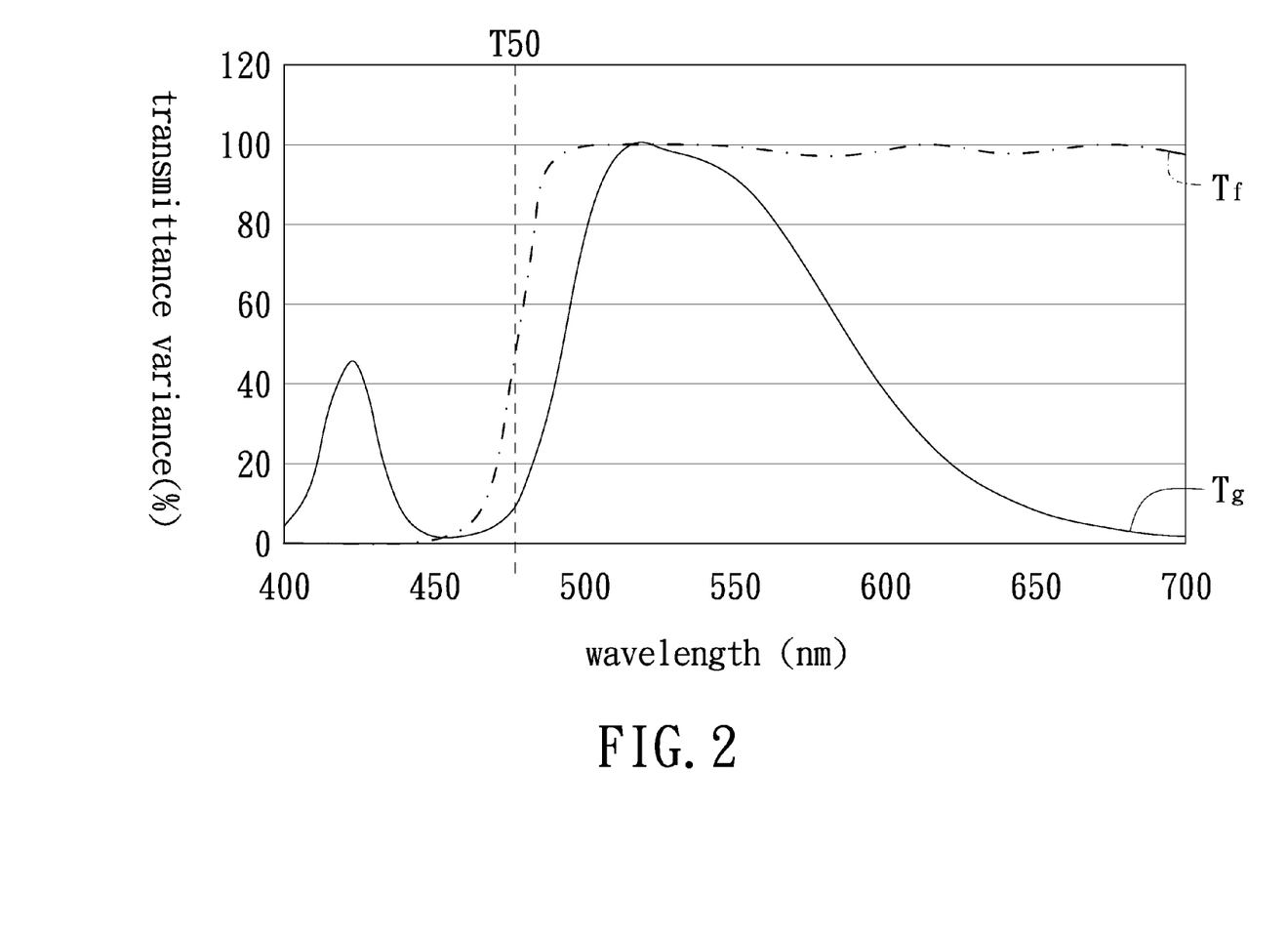
FIG. 2 illustrates a comparative chart of a spectrum of a light emitted by a first light-emitting element and a spectrum of a light emitted from a first lens element of the projection device according to the first embodiment of the invention.

FIG. 2 shows a comparative chart of a spectrum of a light emitted by the first light-emitting element 111 and a spectrum of a light emitted from the first lens element 112 of the projection device 10 according to the first embodiment of the invention. As shown in FIG. 1 and FIG. 2, the spectrum Tg of the light emitted by the first light-emitting element 111 substantially includes a violet light peak and a green light peak, in which the violet light peak is corresponding to the first color light beam L1 having a wavelength range from 400 nm to 450 nm and the green light peak is corresponding to the second color light beam L2 having a wavelength range from 470 nm to 650 nm. A spectral wavelength half-width T50 of a transmission spectrum Tf of the optical filter 116 of the first lens element 112 is ranged from 440 nm to 490 nm, and a wavelength variance of the transmission spectrum of the optical filter 116 is less than 30 nm in a transmittance variance of the optical filter 116 ranged from 10% to 90%. In this embodiment, the optical filter 116 may filter off the first color light beam L1 having a wavelength range from 400 nm to 450 nm and be passed by the second color light beam L2 having a wavelength range from 470 nm to 650 nm.

In this embodiment, the optical filter 116 disposed on a surface of the first lens element 112 that is close to the first light-emitting element 110 may filter off the first color light beam L1 emitted by the first light-emitting element 110 such that the first color light beam L1 having high energy may not emit to the first lens element 112 made of a plastic. The first lens element may prevent aging or etiolation from being emitted by first color light beam having high energy. Therefore, a reliability of the projection device 10 may increase under a long term usage of the projection device 10.

Figure 3:
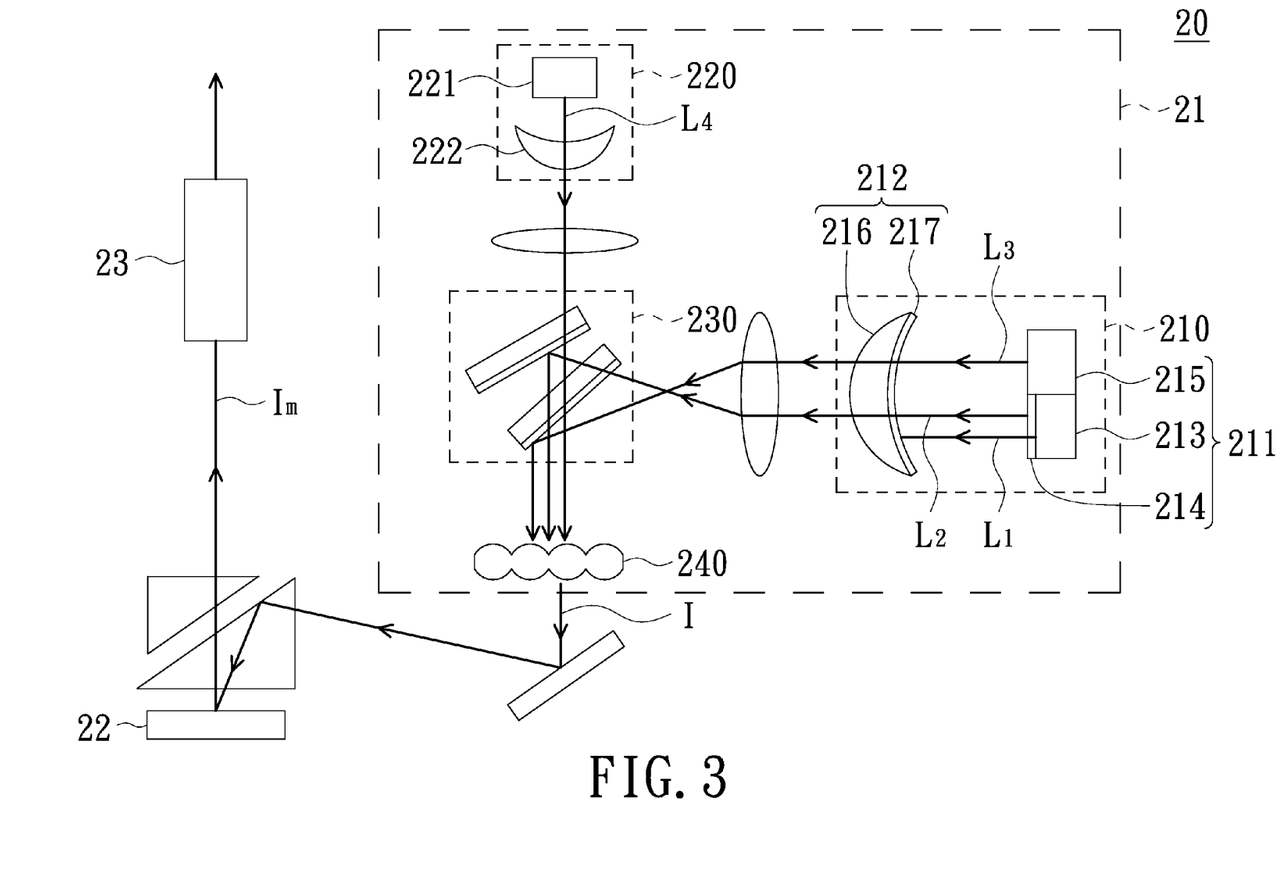
FIG. 3 illustrates a schematic view of a projection device according to a second embodiment of the invention.

FIG. 3 shows a schematic view of a projection device according to a second embodiment of the invention. The projection device 20 includes a light module 21, a light valve 22, and a projection lens 23. The light valve 22 is disposed on a transmission path of a lighting beam I emitted by the light module 21 and suitable for transferring the lighting beam I to an image beam Im. The projection lens 23 is disposed on a transmission path of the image beam Im and used for projecting the image beam Im outward.

The light module 21 includes a first light source 210, a second light source 220 and a light combining element 230. The first light source 210 includes a first light-emitting element 211 and a first lens element 212. The first light-emitting element 211 includes a first light-emitting chip 213, a wavelength conversion material 214 located on the first light-emitting chip 213 and a second light-emitting chip 215. The first light-emitting chip 213 is used for emitting a first color light beam L1. In this embodiment, the first color light beam L1 may be, but not limited to, a violet light having a wavelength range from 400 nm to 450 nm. The wavelength conversion material 214 is used for transferring parts of the first color light beam L1 to a second color light beam L2. In this embodiment, the second color light beam L2 may be, but not limited to, a green light. The second light-emitting chip 215 is used for emitting a third color light beam L3. In this embodiment, the third color light beam L3 may be, but not limited to, a red light. The first lens element 212 faces the first light-emitting element 211 and is simultaneously located on a transmission path of the first color light beam L1, a transmission path of the second color light beam L2 and a transmission path of the third color light beam L3, and the first lens element 212 includes a collimator lens 216 and an optical filter 217 located on a surface of the collimator lens 216. In this embodiment, the optical filter 217, for example, is a high-pass filter for filtering off the first color light beam L1 and being passed by the second color light beam L2 and the third color light beam L3. In other words, the second light beam L2 and the third color light beam L3 is able to pass through the optical filter 217.

The second light source 220 includes a second light-emitting element 221 and a second lens element 222, in which the second light-emitting element 221 is used for emitting a fourth color light beam L4. In this embodiment, the fourth color light beam L4 may be, but not limited to, a blue light. The second lens element 222 is located on a transmission path of the fourth color light beam L4.

In this embodiment, the light combining element 230 may, but be not limited to, includes two dichroic mirrors. The light combining element 230 may be used for receiving the second color light beam L2, the third color light beam L3 and the fourth color light beam L4 to make the second color light beam L2, the third color light beam L3, and the fourth color light beam L4 emit in the same direction. In addition, a light uniforming element 240 may make the second color light beam L2, the third color light beam L3 and the fourth color light beam L4 to form a uniform lighting beam I. In this embodiment, the light uniforming element 240 may be, but not limited to, a micro lens array.

Figure 4:
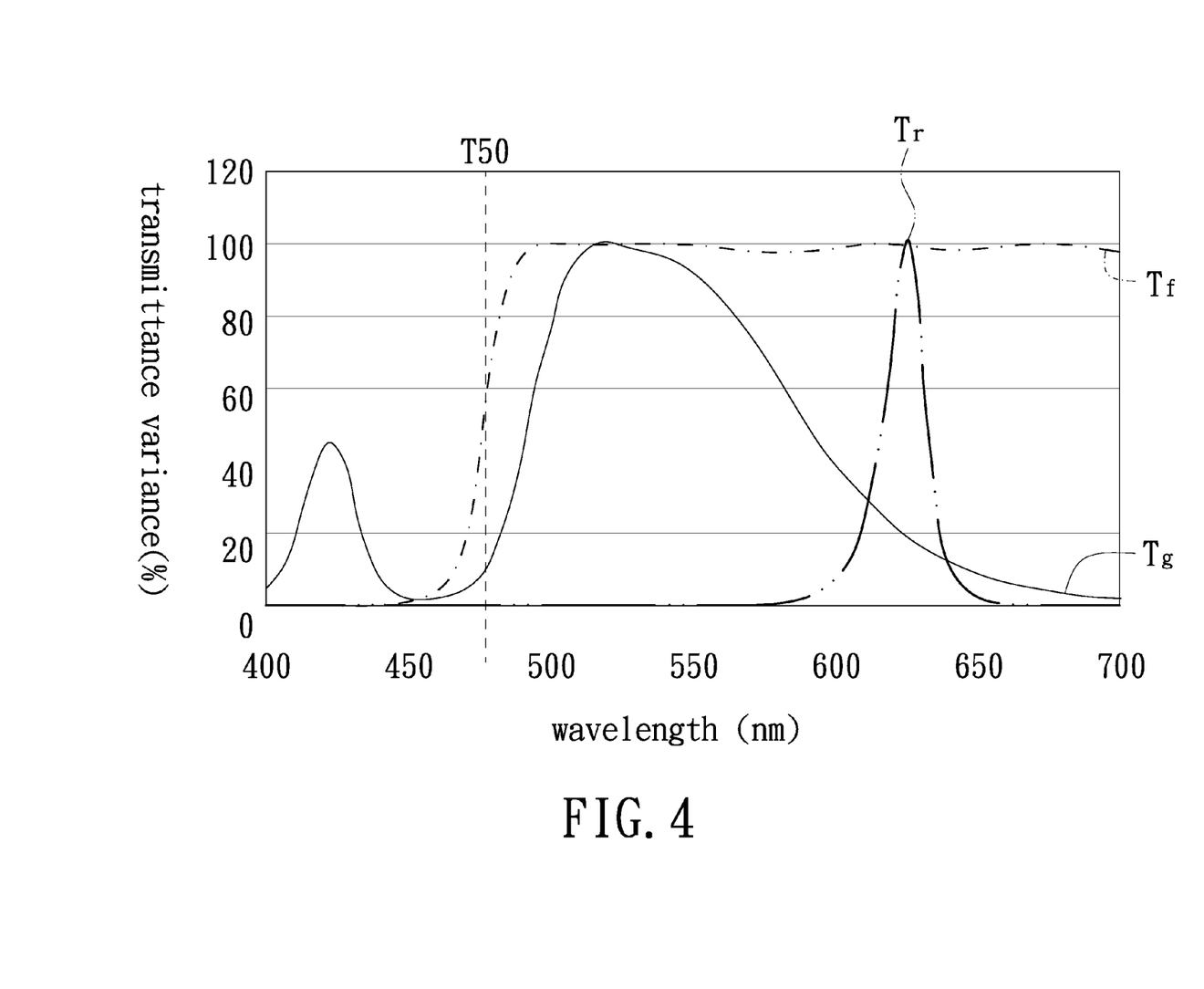
FIG. 4 illustrates a comparative chart of a spectrum of a light emitted by a first light-emitting element and a spectrum of a light emitted from a first lens element of the projection device according to the second embodiment of the invention.

FIG. 4 shows a comparative chart of a spectrum of a light emitted by the first light-emitting element and a spectrum of a light emitted from the first lens element of the projection device according to the second embodiment of the invention. As shown in FIG. 3 and FIG. 4, the spectrum Tg of the light emitted by the first light-emitting chip 213 and the wavelength conversion material 214 of the first light-emitting element 211 substantially includes a violet light peak and a green light peak, in which the violet light peak is corresponding to the first color light beam L1 having a wavelength range from 400 nm to 450 nm and the green light peak is corresponding to the second color light beam L2 having a wavelength range from 470 nm to 650 nm. The spectrum Tr of the light emitted by the second light-emitting chip 215 of the first light-emitting element 211 substantially includes a red light peak, in which the red light peak is corresponding to the third color light beam L3 having a wavelength range from 600 nm to 650 nm. A spectral wavelength half-width T50 of a transmission spectrum Tf of the optical filter 217 of the first lens element 212 is ranged from 440 nm to 490 nm, and a wavelength variance of the transmission spectrum Tf of the optical filter 217 is less than 30 nm in a transmittance variance of the optical filter 217 ranged from 10% to 90%. Referring to FIG. 4, the optical filter 217 may filter off the first color light beam L1 having a wavelength range from 400 nm to 450 nm and be passed by the second color light beam L2 having a wavelength range from 470 nm to 650 nm and the third color light beam L3 having a wavelength range from 440 nm to 480 nm.

In this embodiment, the optical filter 217 disposed on a surface of the first lens element 212 that is the closest to the first light-emitting element 210 may filter off the first color light beam L1 emitted by the first light-emitting element 210 such that the first color light beam L1 having high energy may not emit to the lens element made of a plastic of the projection device 20. The lens element may prevent aging or etiolation from being emitted by first color light beam having high energy. Therefore, a reliability of the projection device 20 may increase under a long term usage of the projection device 20. Comparing with the first embodiment, number of the light-emitting elements of the projection device 20 may be decreased in this embodiment because the second light-emitting chip 215 is integrated in the first light-emitting element 211.

In addition, the third embodiment according to the invention is similar to the projection device of the second embodiment. In the third embodiment, the third color light beam L3 emitted by the second light-emitting chip 215 of the first light-emitting element 211 may be a blue light and the fourth color light beam L4 emitted by the second light-emitting element 221 may be a red light.

Figure 5:
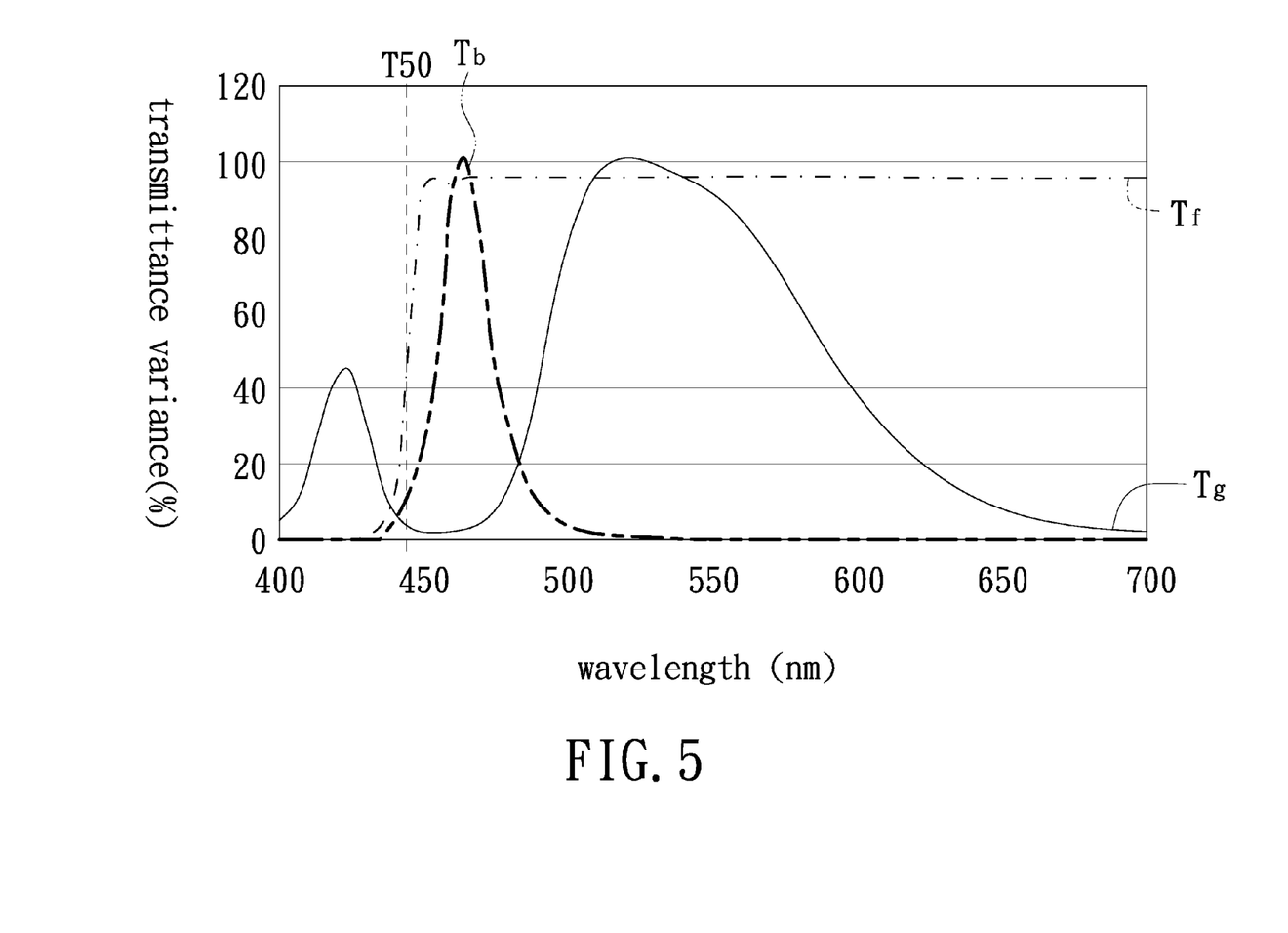
FIG. 5 illustrates a comparative chart of a spectrum of a light emitted by a first light-emitting element and a spectrum of a light emitted from a first lens element of the projection device according to a third embodiment of the invention.

FIG. 5 shows a comparative chart of a spectrum of a light emitted by a first light-emitting element and a spectrum of a light emitted from a first lens element of the projection device according to a third embodiment of the invention. As shown in FIG. 3 and FIG. 5, the spectrum Tg of the light emitted by the first light-emitting chip 213 and the wavelength conversion material 214 of the first light-emitting element 211 substantially includes a violet light peak corresponding to the first color light beam L1 having a wavelength range from 400 nm to 450 nm and a green light peak corresponding to the second color light beam L2 having a wavelength range from 470 nm to 650 nm. A spectrum Tb of the light emitted by the second light-emitting chip 215 of the first light-emitting element 211 has a blue light peak corresponding to the third color light beam L3 having a wavelength range from 440 nm to 480 nm. A spectral wavelength half-width T50 of a transmission spectrum Tf of the optical filter 217 of the first lens element 212 is ranged from 420 nm to 460 nm, and a wavelength variance of the transmission spectrum of the optical filter 217 is less than 20 nm in a transmittance variance of the optical filter 217 ranged from 10% to 90%. Referring to FIG. 4, the optical filter 217 may filter off the first color light beam L1 having a wavelength range from 400 nm to 450 nm and be passed by the second color light beam L2 having a wavelength range from 470 nm to 650 nm and the third color light beam L3 having a wavelength range from 440 nm to 480 nm.

Figure 6:
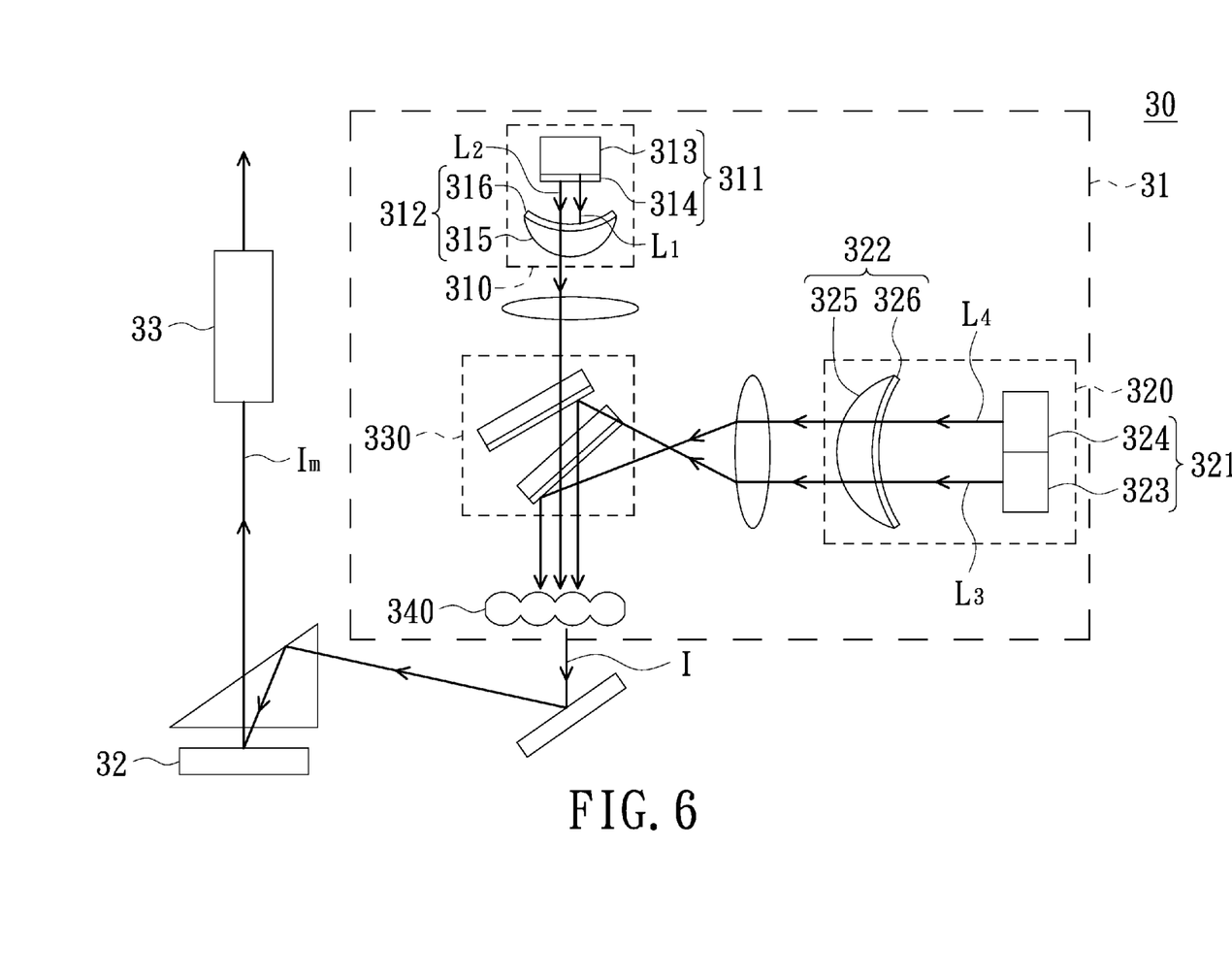
FIG. 6 illustrates a schematic view of a projection device according to a fourth embodiment of the invention.

FIG. 6 shows a schematic view of a projection device according to a fourth embodiment of the invention. The projection device 30 includes a light module 31, a light valve 32, and a projection lens 33. The light valve 32 is disposed on a transmission path of a lighting beam I emitted by the light module 31 and suitable for transferring the lighting beam I to an image beam Im. The projection lens 33 is disposed on a transmission path of the image beam Im and used for projecting the image beam Im outward.

The light module 31 includes a first light source 310, a second light source 320, and a light combining element 330. The first light source 310 includes a first light-emitting element 311 and a first lens element 312. The first light-emitting element 311 includes a first light-emitting chip 313 and a wavelength conversion material 314 located on the first light-emitting chip 313. The first light-emitting chip 313 is used for emitting a first color light beam L1. In this embodiment, the first color light beam L1 may be, but not limited to, a violet light having a wavelength range from 400 nm to 450 nm. The wavelength conversion material 314 is used for transferring parts of the first color light beam L1 to a second color light beam L2. In this embodiment, the second color light beam L2 may be, but not limited to, a green light. The first lens element 312 faces the first light-emitting element 311 and is simultaneously located on a transmission path of the first color light beam L1 and a transmission path of the second color light beam L2. The first lens element 312 includes a collimator lens 315 and an optical filter 316 located on a surface of the collimator lens 315. In this embodiment, the optical filter 316 is a high-pass filter for filtering off the first color light beam L1 and being passed by the second color light beam L2. In other words, the second color light beam L2 is able to pass through the optical filter 316.

The second color light source 320 includes a second light-emitting element 321 and a second lens element 322, and the second light-emitting element 321 includes a second light-emitting chip 323 and a third light-emitting chip 324. The second light-emitting chip 323 is used for emitting a third color light beam L3. In this embodiment, the third color light beam L3 may be, but not limited to, a blue light having a wavelength range from 440 nm to 480 nm. The third light-emitting chip 324 is used for emitting a fourth color light beam L4. In this embodiment, the fourth color light beam L4 may be, but not limited to, a red light. The second lens element 322 is located on a transmission path of the third color light beam L3 and a transmission path of the fourth color light beam L4.

In this embodiment, the light combining element 330 may, but be not limited to, include two dichroic mirrors. The light combining element 330 may be used for receiving the second color light beam L2, the third color light beam L3 and the fourth color light beam L4 to make the second color light beam L2, the third color light beam L3 and the fourth color light beam L4 emit in the same direction. In addition, a light uniforming element 340 may make the second color light beam L2, the third color light beam L3 and the fourth color light beam L4 to form a uniform lighting beam I. In this embodiment, the light uniforming element 240 may be, but not limited to, a micro lens array.

Figure 7:
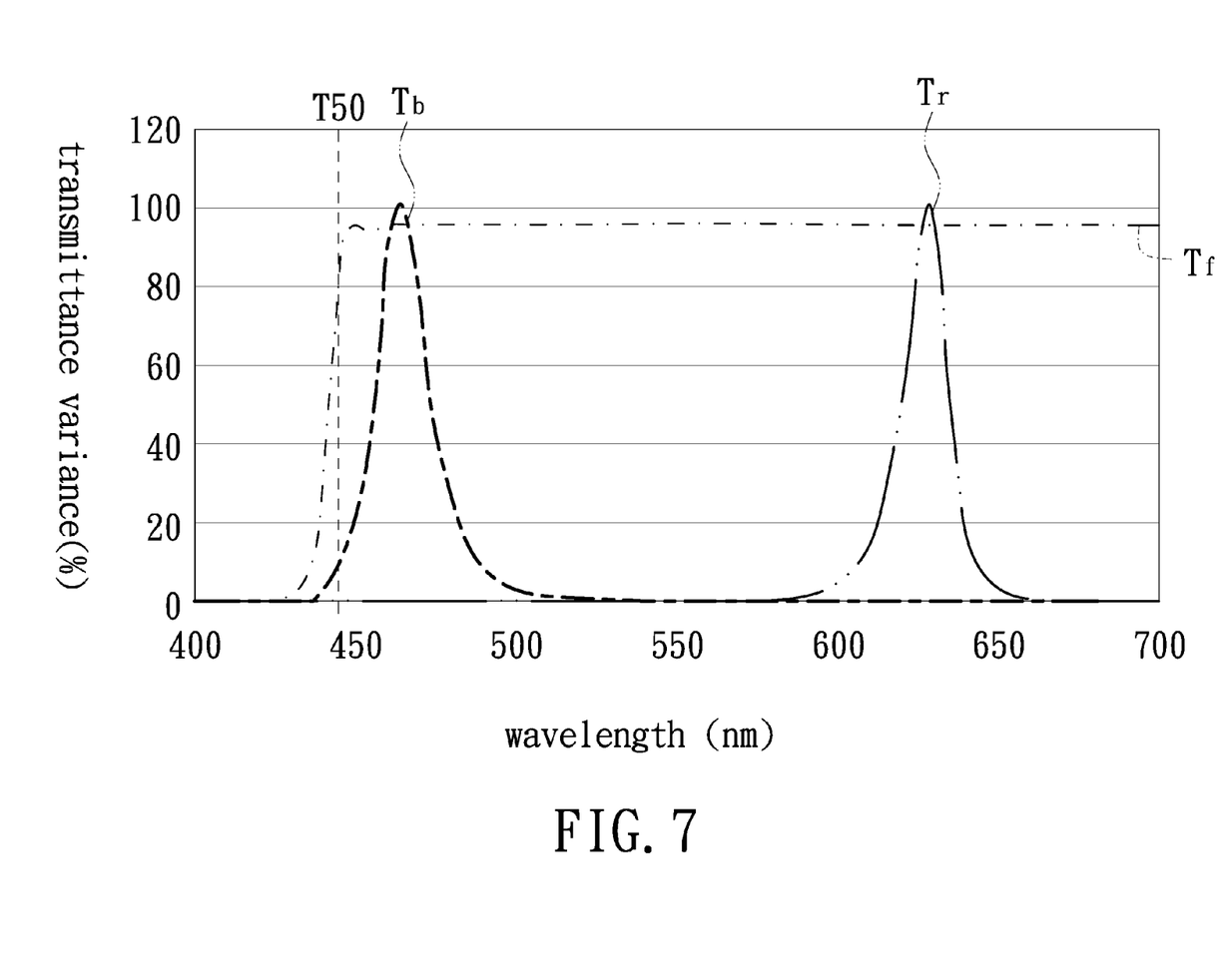
FIG. 7 illustrates a comparative chart of a spectrum of a light emitted by a second light-emitting element and a spectrum of a light emitted from a second lens element of the projection device according to the fourth embodiment of the invention.

FIG. 7 shows a comparative chart of a spectrum of a light emitted by a second light-emitting element and a spectrum of a light emitted from a second lens element of the projection device according to the fourth embodiment of the invention. As shown in FIG. 6 and FIG. 7, the spectrum Tb of the light emitted by the second light-emitting chip 323 substantially includes a blue light peak and a red light peak, in which the blue light peak is corresponding to the third color light beam L3 having a wavelength range from 440 nm to 480 nm and the red light peak is corresponding to the fourth color light beam L4 having a wavelength range from 600 nm to 650 nm. A spectral wavelength half-width T50 of a transmission spectrum Tf of the optical filter 326 of the second lens element 322 is ranged from 420 nm to 460 nm, and a wavelength variance of the transmission spectrum Tf of the optical filter 326 is less than 20 nm in a transmittance variance of the optical filter 326 ranged from 10% to 90%. In this embodiment, the optical filter 326 may further filter off part of the third color light beam L3 having a wavelength range from 400 nm to 450 nm and be passed by the forth color light beam L4 having a wavelength range from 600 nm to 650 nm.

In this embodiment, the optical filter 326 disposed on a surface of the second lens element 322 may further filter off part of the third color light beam L3 having a wavelength range from 400 nm to 450 nm such that the third color light beam L3 having high energy may not emit to the lens element made of plastic of the projection device 30. The lens element may prevent aging or etiolation from being emitted by third color light beam having high energy. Therefore, a reliability of the projection device 30 may increase under a long term usage of the projection device 30.

Figure 8:
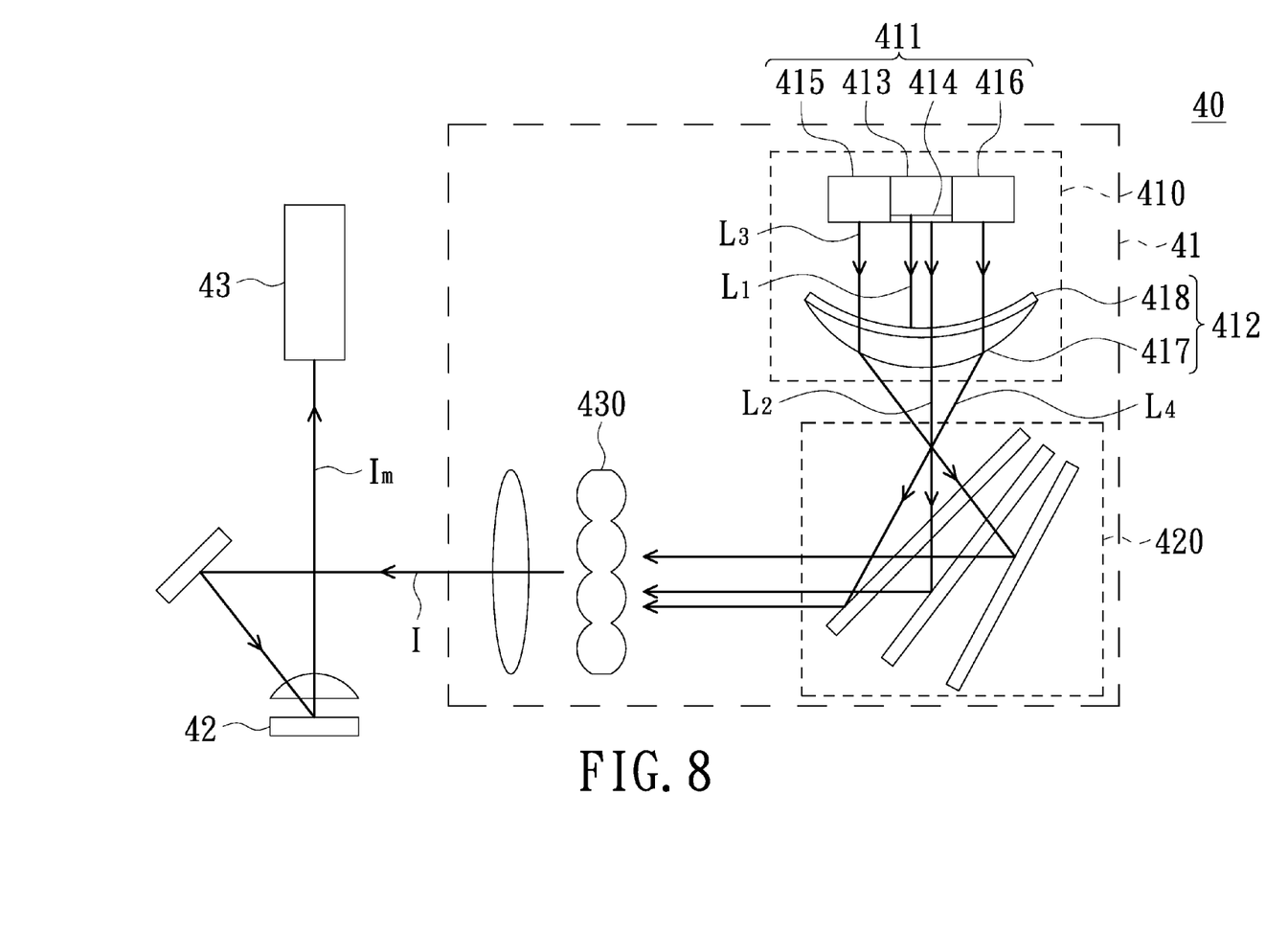
FIG. 8 illustrates a schematic view of a projection device according to a fifth embodiment of the invention.

FIG. 8 shows a schematic view of a projection device according to a fifth embodiment of the invention. The projection device 40 includes a light module 41, a light valve 42, and a projection lens 43. The light valve 42 is disposed on a transmission path of a lighting beam I emitted by the light module 41 and suitable for transferring the lighting beam I to an image beam Im. The projection lens 43 is disposed on a transmission path of the image beam Im and used for projecting the image beam Im outward.

The light module 41 includes a first light source 410, and a light combining element 420. The first light source 410 includes a first light-emitting element 411 and a first lens element 412. The first light-emitting element 411 includes a first light-emitting chip 413, a wavelength conversion material 414 located on the first light-emitting chip 413, a second light-emitting chip 415 and a third light-emitting chip 416. The first light-emitting chip 413 is used for emitting a first color light beam L1. In this embodiment, the first color light beam L1 may be, but not limited to, a violet light having a wavelength range from 400 nm to 450 nm. The wavelength conversion material 414 is used for transferring parts of the first color light beam L1 to a second color light beam L2. In this embodiment, the second color light beam L2 may be, but not limited to, a green light. The second light-emitting chip 415 is used for emitting a third color light beam L3 and the third color light beam L3 is a red light. The third light-emitting chip 416 is used for emitting a fourth color light beam L4 and the fourth color light beam L4 may be, but not limited to, a blue light having a wavelength range from 440 nm to 480 nm. The first lens element 412 faces the first light-emitting element 411 and is simultaneously located on a transmission path of the first color light beam L1, a transmission path of the second color light beam L2, a transmission path of the third color light beam L3, and a transmission path of the fourth color light beam L4. The first lens element 412 includes a collimator lens 417 and an optical filter 418 located on a surface of the collimator lens 417. In this embodiment, the optical filter 418, for example, is a high-pass filter for filtering off the first color light beam L1 and being passed by the second color light beam L2, the third color light beam L3 and the fourth color light beam L4. In other words, the second color light beam L2, the third color light beam L3 and the fourth color light beam L4 are able to pass through the optical filter 418.

In this embodiment, the light combining element 420 may, but be not limited to, include three dichroic mirrors. The light combining element 420 may be used for receiving the second color light beam L2, the third color light beam L3 and the fourth color light beam L4 to make the second color light beam L2, the third color light beam L3 and the fourth color light beam L4 emit in the same direction. In addition, a light uniforming element 430 may make the second color light beam L2, the third color light beam L3, and the fourth color light beam L4 to form a uniform lighting beam I. In this embodiment, the light uniforming element 430 may be, but not limited to, a micro lens array.

Figure 9:
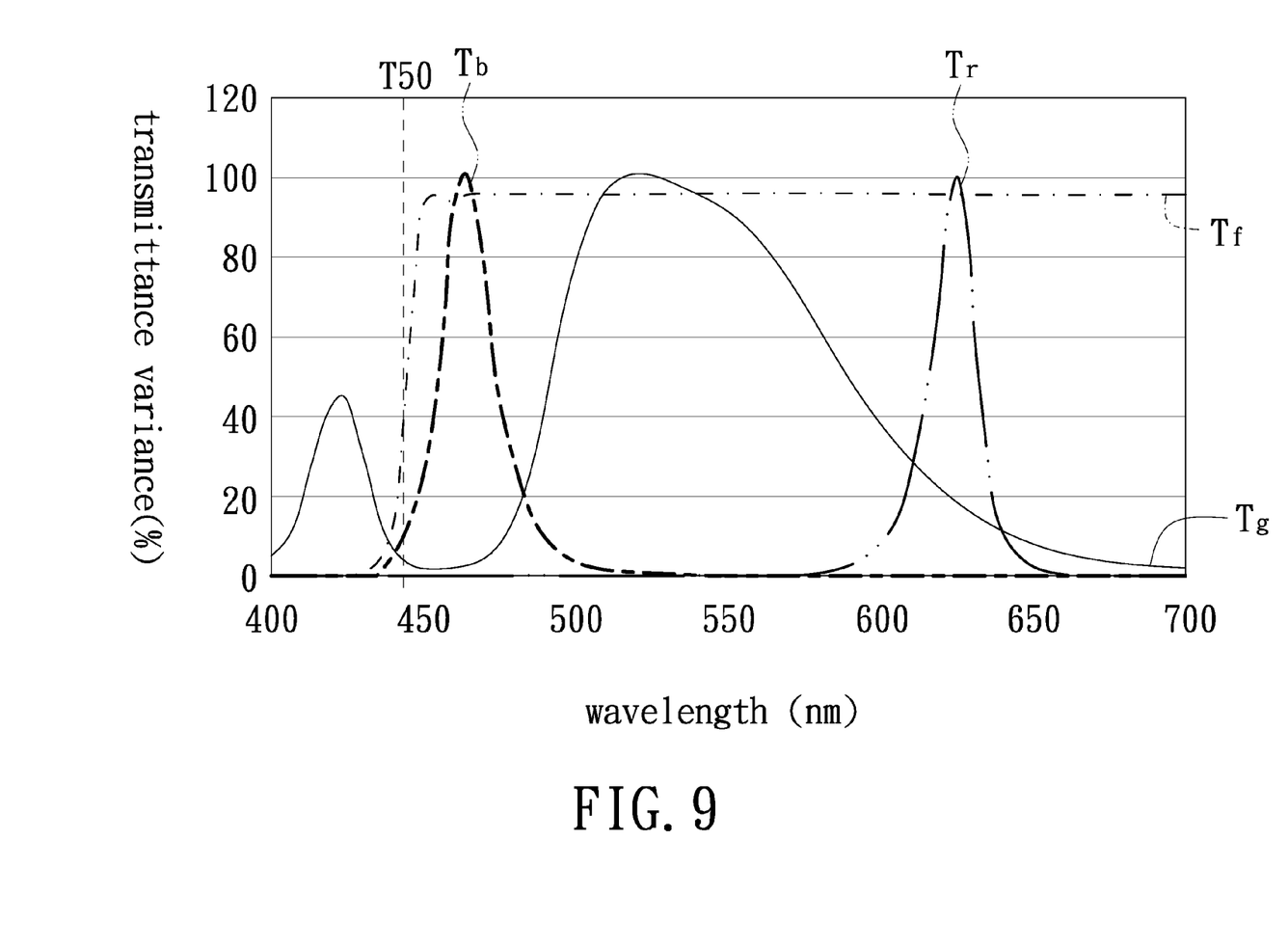
FIG. 9 illustrates a comparative chart of a spectrum of a light emitted by a first light-emitting element and a spectrum of a light emitted from a first lens element of the projection device according to the fifth embodiment of the invention.

FIG. 9 shows a comparative chart of a spectrum of a light emitted by a first light-emitting element and a spectrum of a light emitted from a first lens element of the projection device according to the fifth embodiment of the invention. As shown in FIG. 8 and FIG. 9, the spectrum Tg of the light emitted by the first light-emitting chip 413 and the wavelength conversion material 414 of the first light-emitting element 410 substantially includes a violet light peak and a green light peak, in which the violet light peak is corresponding to the first color light beam L1 having a wavelength range from 400 nm to 450 nm and the green light peak is corresponding to the second color light beam L2 having a wavelength range from 470 nm to 650 nm. The spectrum Tr of the light emitted by the second light-emitting chip 415 substantially includes a red light peak, in which the red light peak is corresponding to the third color light beam L3 having a wavelength range from 600 nm to 650 nm. The spectrum Tb of the light emitted by the third light-emitting chip 416 substantially includes a blue light peak, in which the blue light peak is corresponding to the fourth color light beam L4 having a wavelength range from 440 nm to 480 nm. A spectral wavelength half-width T50 of a transmission spectrum Tf of the optical filter 418 of the first lens element 412 is ranged from 420 nm to 460 nm, and a wavelength variance of the transmission spectrum Tf of the optical filter 418 is less than 20 nm in a transmittance variance of the optical filter 418 ranged from 10% to 90%. In this embodiment, the optical filter 418 may filter off the first color light beam L1 having a wavelength range from 400 nm to 450 nm and be passed by the second color light beam L2 having a wavelength range from 470 nm to 650 nm and the third color light beam L3 having a wavelength range from 600 nm to 650 nm. In addition, the optical filter 418 may filter off parts of the fourth color light beam L4 having a wavelength range from 400 nm to 450 nm. Comparing with the foregoing embodiments, number of the light-emitting elements of the projection device may be decreased because the second light-emitting chip 415 and the third light-emitting chip 416 are integrated in the first light-emitting element 411.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A light module, comprising:
 a first light source, comprising:
  a first light-emitting element comprising a first light-emitting chip for emitting a first color light beam and a wavelength conversion material located on the first light-emitting chip for transferring parts of the first color light beam to a second color light beam; and a first lens element facing the first light-emitting element and located on a transmission path of the first color light beam and a transmission path of the second color light beam, and the first lens element comprising an optical filter for filtering off the first color light beam and being passed by the second color light beam, wherein the first color light beam emitted from the first light-emitting chip transmits to the optical filter after passing through the wavelength conversion material.

2. The light module according to claim 1, further comprising:

a second light source for emitting a third color light beam;
a third light source for emitting a fourth color light beam; and
a light combining element for receiving the second color light beam, the third color light beam and the fourth color light beam to make the second color light beam, the third color light beam and the fourth color light beam emit in the same direction and be formed a lighting beam, wherein the optical filter is a high-pass filter and a spectral wavelength half-width of a transmission spectrum of the high-pass filter is ranged from 440 nm to 490 nm, and a wavelength variance of the transmission spectrum of the high-pass filter is less than 30 nm in a transmittance variance of the high-pass filter ranged from 10% to 90%.

3. The light module according to claim 1, wherein the first light-emitting element further comprises a second light-emitting chip for emitting a third color light beam, and the first lens element is located on a transmission pathway of the third color light beam, and the optical filter is used for being passed by the third color light beam, and the light module further comprises:

a second light source for emitting a fourth color light beam; and
a light combining element for receiving the second color light beam, the third color light beam and the fourth color light beam to make the second color light beam, the third color light beam and the fourth color light beam emit in the same direction and be formed a lighting beam.

4. The light module according to claim 3, wherein the third color light beam is a red light, and the optical filter is a high-pass filter and a spectral wavelength half-width of a transmission spectrum of the high-pass filter is ranged from 440 nm to 490 nm, and a wavelength variance of the transmission spectrum of the high-pass filter is less than 30 nm in a transmittance variance of the high-pass filter ranged from 10% to 90%.

5. The light module according to claim 3, wherein the third color light beam is a blue light having a wavelength range from 440 nm to 480 nm, and the optical filter is a high-pass filter and a spectral wavelength half-width of a transmission spectrum of the high-pass filter is ranged from 420 nm to 460 nm, and a wavelength variance of the transmission spectrum of the high-pass filter is less than 20 nm in a transmittance variance of the high-pass filter ranged from 10% to 90%.

6. The light module according to claim 1, further comprising:

a second light source comprising:
a second light-emitting element comprising a second light-emitting chip for emitting a third color light beam and a third light-emitting chip for emitting a fourth color light beam; and a second lens element facing the second light-emitting element and located on a transmission path of the third color light beam and a transmission path of the fourth color light beam, and the second lens element comprising an optical filter passed by the third color light beam and the fourth color light beam; and a light combining element for receiving the second color light beam, the third color light beam and the fourth color light beam to make the second color light beam, the third color light beam, and the fourth color light beam emit in the same direction and be formed a lighting beam.

7. The light module according to claim 6, wherein the third color light beam is a blue light having a wavelength range from 440 nm to 480 nm, and the optical filter is a high-pass filter and a spectral wavelength half-width of a transmission spectrum of the high-pass filter is ranged from 420 nm to 460 nm, and a wavelength variance of the transmission spectrum of the high-pass filter is less than 20 nm in a transmittance variance of the high-pass filter ranged from 10% to 90%.

8. The light module according to claim 1, wherein the first light-emitting element further comprises a second light-emitting chip for emitting a third color light beam and a third light-emitting chip for emitting a fourth color light beam, and the first lens element is further located on a transmission path of the third color light beam and a transmission path of the fourth color light beam, and the optical filter is passed by the third color light beam and the forth color light beam, and the light module further comprises a light combining element for receiving the second color light beam, the third color light beam and the fourth color light beam to make the second color light beam, the third color light beam and the fourth color light beam emit in the same direction and be formed a lighting beam.

9. The light module according to claim 8, wherein the third color light beam is a red light and the fourth color light beam is a blue light having a wavelength range from 440 nm to 480 nm, and the optical filter is a high-pass filter and a spectral wavelength half-width of a transmission spectrum of the high-pass filter is ranged from 420 nm to 460 nm, and a wavelength variance of the transmission spectrum of the high-pass filter is less than 20 nm in a transmittance variance of the high-pass filter ranged from 10% to 90%.

10. A projection device, comprising:
a light module, comprising:
a first light source, comprising:
a first light-emitting element comprising a first light-emitting chip for emitting a first color light beam and a wavelength conversion material located on the first light-emitting chip for transferring parts of the first color light beam to a second color light beam; and
a first lens element facing the first light-emitting element and located on a transmission path of the first color light beam and a transmission path of the second color light beam, and the first lens element comprising an optical filter for filtering off the first color light beam and being passed by the second color light beam; and
a light valve disposed on a transmission path of a lighting beam for transferring the lighting beam to an image beam; and
a projection lens disposed on a transmission path of the image beam.

11. The projection device according to claim 10, wherein the light module further comprises:

a second light source for emitting a third color light beam;
a third light source for emitting a fourth color light beam; and a light combining element for receiving the second color light beam, the third color light beam and the fourth color light beam to make the second color light beam, the third color light beam and the fourth color light beam emit in the same direction and be formed a lighting beam.

12. The projection device according to claim 11, wherein the optical filter is a high-pass filter and a spectral wavelength half-width of a transmission spectrum of the high-pass filter is ranged from 440 nm to 490 nm, and a wavelength variance of the transmission spectrum of the high-pass filter is less than 30 nm in a transmittance variance of the high-pass filter ranged from 10% to 90%.

13. The projection device according to claim 10, wherein the first light-emitting element further comprises a second light-emitting chip for emitting a third color light beam, and the first lens element is located on a transmission pathway of the third color light beam, and the optical filter is used for being passed by the third color light beam, and the light module further comprises:
   a second light source for emitting a fourth color light beam; and
   a light combining element for receiving the second color light beam, the third color light beam and the fourth color light beam to make the second color light beam, the third color light beam and the fourth color light beam emit in the same direction and be formed a lighting beam.

14. The projection device according to claim 13, wherein the third color light beam is a red light, and the optical filter is a high-pass filter and a spectral wavelength half-width of a transmission spectrum of the high-pass filter is ranged from 440 nm to 490 nm, and a wavelength variance of the transmission spectrum of the high-pass filter is less than 30 nm in a transmittance variance of the high-pass filter ranged from 10% to 90%.

15. The projection device according to claim 13, wherein the third color light beam is a blue light having a wavelength range from 440 nm to 480 nm, and the optical filter is a high-pass filter and a spectral wavelength half-width of a transmission spectrum of the high-pass filter is ranged from 420 nm to 460 nm, and a wavelength variance of the transmission spectrum of the high-pass filter is less than 20 nm in a transmittance variance of the high-pass filter ranged from 10% to 90%.

16. The projection device according to claim 10, further comprising:
   a second light source comprising:
      a second light-emitting element comprising a second light-emitting chip for emitting a third color light beam and a third light-emitting chip for emitting a fourth color light beam; and
      a second lens element facing the second light-emitting element and located on a transmission path of the third color light beam and a transmission path of the fourth color light beam, and the second lens element comprising an optical filter passed by the third color light beam and the fourth color light beam; and
   a light combining element for receiving the second color light beam, the third color light beam and the fourth color light beam to make the second color light beam, the third color light beam, and the fourth color light beam emit in the same direction and be formed a lighting beam.

17. The projection device according to claim 16, wherein the third color light beam is a blue light having a wavelength range from 440 nm to 480 nm, and the optical filter is a high-pass filter and a spectral wavelength half-width of a transmission spectrum of the high-pass filter is ranged from 420 nm to 460 nm, and a wavelength variance of the transmission spectrum of the high-pass filter is less than 20 nm in a transmittance variance of the high-pass filter ranged from 10% to 90%.

18. The projection device according to claim 10, wherein the first light-emitting element further comprises a second light-emitting chip for emitting a third color light beam and a third light-emitting chip for emitting a fourth color light beam, and the first lens element is further located on a transmission path of the third color light beam and a transmission path of the fourth color light beam, and the optical filter is passed by the third color light beam and the forth color light beam, and the light module further comprises a light combining element for receiving the second color light beam, the third color light beam and the fourth color light beam to make the second color light beam, the third color light beam and the fourth color light beam emit in the same direction and be formed a lighting beam.

19. The light module according to claim 1, wherein the optical filter is not rotatable.

20. A light module, comprising:
   a first light source, comprising:
      a first light-emitting element comprising a first light-emitting chip for emitting a first color light beam and a wavelength conversion material located on the first light-emitting chip for transferring parts of the first color light beam to a second color light beam, wherein the first light-emitting element further comprises a second light-emitting chip for emitting a third color light beam and a third light-emitting chip for emitting a fourth color light beam; and
   a first lens element facing the first light-emitting element and located on transmission paths of the first color light beam, the second color light beam, the third color light beam and the forth color light beam, wherein the first lens element comprises an optical filter for filtering off the first color light beam and being passed by the second color light beam, the third color light beam and the fourth color light beam.

* * * * *